(12) United States Patent
Kombowski et al.

(10) Patent No.: US 8,397,886 B2
(45) Date of Patent: Mar. 19, 2013

(54) TORQUE TRANSMISSION DEVICE

(75) Inventors: Eugen Kombowski, Buehl (DE); Dominique Engelmann, Offendorf (FR); Markus Werner, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/349,328

(22) Filed: Jan. 12, 2012

(65) Prior Publication Data

US 2012/0111684 A1   May 10, 2012

Related U.S. Application Data

(63) Continuation of application No. PCT/DE2010/000742, filed on Jun. 29, 2010.

(30) Foreign Application Priority Data

Jul. 16, 2009  (DE) .......................... 10 2009 033 848
Nov. 26, 2009  (DE) .......................... 10 2009 055 901

(51) Int. Cl.
*F16H 45/02* (2006.01)
*F16F 15/14* (2006.01)

(52) U.S. Cl. ...................... 192/3.28; 192/30 V; 192/212

(58) Field of Classification Search ................. 192/3.28, 192/30 V; 60/338; 74/574.2
See application file for complete search history.

(56) References Cited

U.S. PATENT DOCUMENTS

| 6,026,940 A | 2/2000 | Sudau |
| 2010/0269497 A1* | 10/2010 | Engelmann et al. ............ 60/338 |
| 2011/0240429 A1* | 10/2011 | Heuler et al. ................ 192/3.28 |

FOREIGN PATENT DOCUMENTS

| DE | 19514411 C5 | 11/1995 |
| DE | 19804227 B4 | 8/1999 |
| DE | 102004004176 A1 | 8/2005 |
| DE | 102008057647 A1 * | 6/2009 |
| DE | 102008057648 A1 * | 6/2009 |
| DE | 102009042837 A1 * | 4/2010 |
| EP | 1744074 A2 | 1/2007 |
| WO | 2010066665 A2 | 6/2010 |

* cited by examiner

*Primary Examiner* — Richard M. Lorence
(74) *Attorney, Agent, or Firm* — Simpson & Simpson, PLLC

(57) ABSTRACT

A torque transmission device (10), comprising a pump shell (12), a turbine shell (14) that is drivable by the pump shell, and a torsion vibration damper (11). The torsion vibration damper includes a damper input component (18) and a damper output component (20), wherein a vibration absorber (24) is configured on the damper output component.

12 Claims, 2 Drawing Sheets

US 8,397,886 B2

TORQUE TRANSMISSION DEVICE

CROSS-REFERENCE TO RELATED APPLICATIONS

This application is filed under 35 U.S.C. §120 and §365(c) as a continuation of International Patent Application No. PCT/DE2010/000742 filed Jun. 29, 2010, which application claims priority from German Patent Application No. DE 10 2009 033 848.9 filed Jul. 16, 2009, and German Patent Application No. DE 10 2009 055 901.9 filed Nov. 26, 2009, which applications are incorporated herein by reference in their entireties.

FIELD OF THE INVENTION

The invention relates to a torque transmission device.

BACKGROUND OF THE INVENTION

Torque transmission devices of this type are known from the document DE 195 14 411 C5. They can be configured as torque converters arranged between an output side of a motor vehicle, e.g., an internal combustion engine and an input side, e.g., a transmission. The torque converter includes a pump shell that is arranged within a converter housing and connected to the output side and a turbine shell that is drivable through the pump shell through a fluid wherein the turbine shell is coupled with an input component, e.g., a damper hub coupled with a transmission input shaft of a transmission. A torsion vibration damper is operatively arranged between the turbine shell and the input side so that a damper input component is connected non-rotatably with a turbine hub receiving the turbine shell and a damper output component is connected non-rotatably with the input side, especially with the damper hub. The turbine hub and the damper hub are configured rotatable relative to one another within limits so that a torque transmission is provided through the spring elements operatively connecting the damper input component with the damper output component.

Torsion vibrations originating from the output side of the combustion engine are dampened by the torsion vibration damper so that a torsion vibration dampening is facilitated between the output side and the input side.

BRIEF SUMMARY OF THE INVENTION

Thus, it is an object of the invention to facilitate an improved torsion vibration dampening of a torque transmission device.

Accordingly, a torque transmission device is proposed including a pump shell arranged in a converter housing and connected to the output side and a turbine shell drivable by the pump shell through a fluid for forming a first torque transmission path between the converter housing and an input side and a converter lockup clutch with a clutch input component that is connectable with the converter housing and a clutch output component configured to be brought into frictional engagement with the clutch input component for partially or completely bridging the first torque transmission path for configuring a second torque transmission path between the converter housing and an I input side and a torsion vibration damper arranged in the force flow between the clutch output and the input side. The torsion vibration damper includes a damper input component and a damper output component that is rotatable within limits against the effect of at least one spring element directly or indirectly relative to the damper input component and connected non-rotatably with the input side, wherein the turbine is rotatable through the effect of at least one spring element relative to the input side and a vibration absorber is configured at the damper output component. Thus, the vibration absorber can be arranged or configured at the damper output component. It is also conceivable that a component of the vibration absorber is configured from the damper output component, e.g., in that the component is an integral component of the damper output component while another component of the vibration absorber is arranged at the damper output component, e.g., arranged as a separate element thereon. The vibration absorber can be tuned to a speed and facilitates reducing and/or absorbing torsion vibrations introduced from the output side at this speed. This improves the torsion vibration damping of the torque transmission device. In the force flow between the damper input component and the damper output component also at least one damper intermediate component can be operatively arranged, which on the one hand side is rotatable within limits relative to the damper input component through first spring elements for forming a first damper stage and which is on the other hand side rotatable within limits relative to the damper output component or another damper intermediate component through the effect of additional spring elements for forming another damper stage. The spring elements of one respective damper stage can operate in series or in parallel or can be operatively connected in a combination of both. A clearance angle can also be provided for some spring elements, wherein the spring element is only rotatable within limits within the clearance angle or not effective at all.

The turbine is rotatable relative to the input side through the effect of at least one spring element. For example, the turbine can be connected non-rotatably with the damper input component or with a damper intermediary component or can be connected rotatable within limits through the effect of spring elements. The spring elements can thus be rotatably connected as additional elastic elements. Advantageously, the elastic elements operate in parallel with at least one damper stage or a spring element of the torsion vibration damper, e.g., forming a turbine absorber.

The vibration absorber preferably operates in a speed adaptive manner. The resonance frequency of the vibration absorber can be tuned to a defined speed ratio of a frequency of the torsion vibration relative to the uniform rotation frequency of the internal combustion engine. Thus, a reduction of the torsion vibrations can be facilitated over a speed range.

In an embodiment of the invention, the vibration absorber is configured as a centrifugal force pendulum with pendulum masses that are displaceable within limits over the circumference of the damper output component relative to the damper output component. Advantageously, the pendulum masses are arranged on both sides at the damper output component, in particular radially outside of the outer circumference of the damper input component. This facilitates a better efficiency of the absorption effect through the centrifugal force pendulum.

In another embodiment according to the invention the damper input component is configured from at least two disc components which are in particular offset from one another in axial direction. This facilitates an arrangement with little installation space requirement for an optional lockup clutch and its connection through the clutch output component to the damper input component, e.g., by attaching the clutch output component at one of the two disc components and attaching the turbine shell at the other of the two disc components.

The damper output component is advantageously received axially between the at least two disc components. This facilitates a symmetrical force introduction into the spring elements that are operatively arranged between the damper input component and the damper output component and it also implements low installation space for the torsion vibration damper.

In another embodiment according to the invention the damper output component is connectable non-rotatably on the input side with a damper hub that is connectable with a transmission input shaft of a transmission.

In another embodiment according to the invention, the damper input component is connectable non-rotatably with a turbine hub receiving the turbine shell.

In another embodiment according to the invention, the torsion vibration damper is arranged within the converter housing. This facilitates a small installation space and also a lubrication of the components of the torsion vibration damper through the fluid introduced into the converter housing.

In a preferred embodiment of the invention, a converter lockup clutch is arranged within the converter housing, wherein the clutch output component of the converter lockup clutch is connectable with the damper input component. In a closed or slipping condition of the converter lockup clutch, a portion of the torque introduced through the output side or the entire torque can be transferred through the torsion vibration damper onto the input side.

BRIEF DESCRIPTION OF THE DRAWINGS

Other advantages and advantageous embodiments of the invention are objects of the subsequent drawing figures and their associated descriptions wherein a scale representation was omitted for reasons of clarity, wherein.

DETAILED DESCRIPTION OF THE INVENTION

Figure 1:
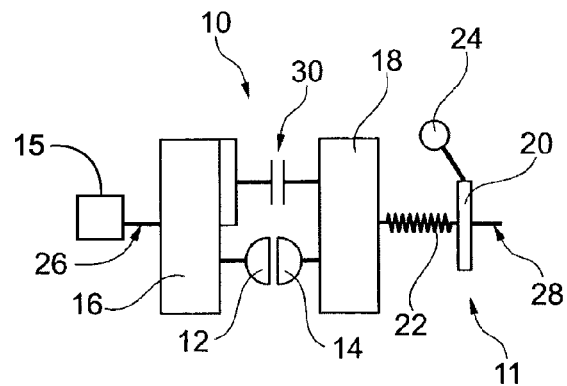
FIG. 1 illustrates a schematic diagram of a torque transmission device in a particular embodiment of the invention.

FIG. 1 illustrates a simplified schematic diagram of a torque transmission device 10 according to a particular embodiment of the invention. The torque transmission device 10 is used for transmitting torque between an output side 26 which is, e.g., indirectly or directly connected with an internal combustion engine 15 and an input side 28 which is, e.g., indirectly or directly connected with the input of a transmission like, e.g., a transmission input shaft. The torque transmission device 10 includes a pump shell 12 attached at the converter housing 16 and a turbine shell 14 drivable through the pump shell and a converter lockup clutch 30 which can facilitate a second torque transmission path between the output side 26 and the input side 28 alternatively or in parallel with the first torque transmission path between the converter housing or the pump shell 12 and the turbine shell 14.

In the force flow between the output side 26 and the input side 28, a torsion vibration damper 11 for rotations and/or torsion vibrations is operatively arranged. The torsion vibration damper 11 includes a damper input component 18 connected with the turbine shell 14 and coupled with a clutch output component 40 of the converter lockup clutch 30 and a damper output component 20 connected with the input side 28 and spring elements 22 operatively arranged between the damper input component 18 and the damper output component 20. At the damper output component 20, a vibration absorber is arranged in particular for absorbing torsion vibrations introduced from the output side 26 onto the torsion vibration damper 11. The vibration absorber 24 can be configured speed adaptive, in particular as a centrifugal force pendulum 56 and facilitates a supporting effect of the torsion vibration damping through the torsion vibration damper 11. The resonance frequency of the vibration absorber 24 can thus be tuned to a defined speed ratio of a frequency of the torsion vibration to the uniform rotation frequency of the internal combustion engine.

Figure 2:
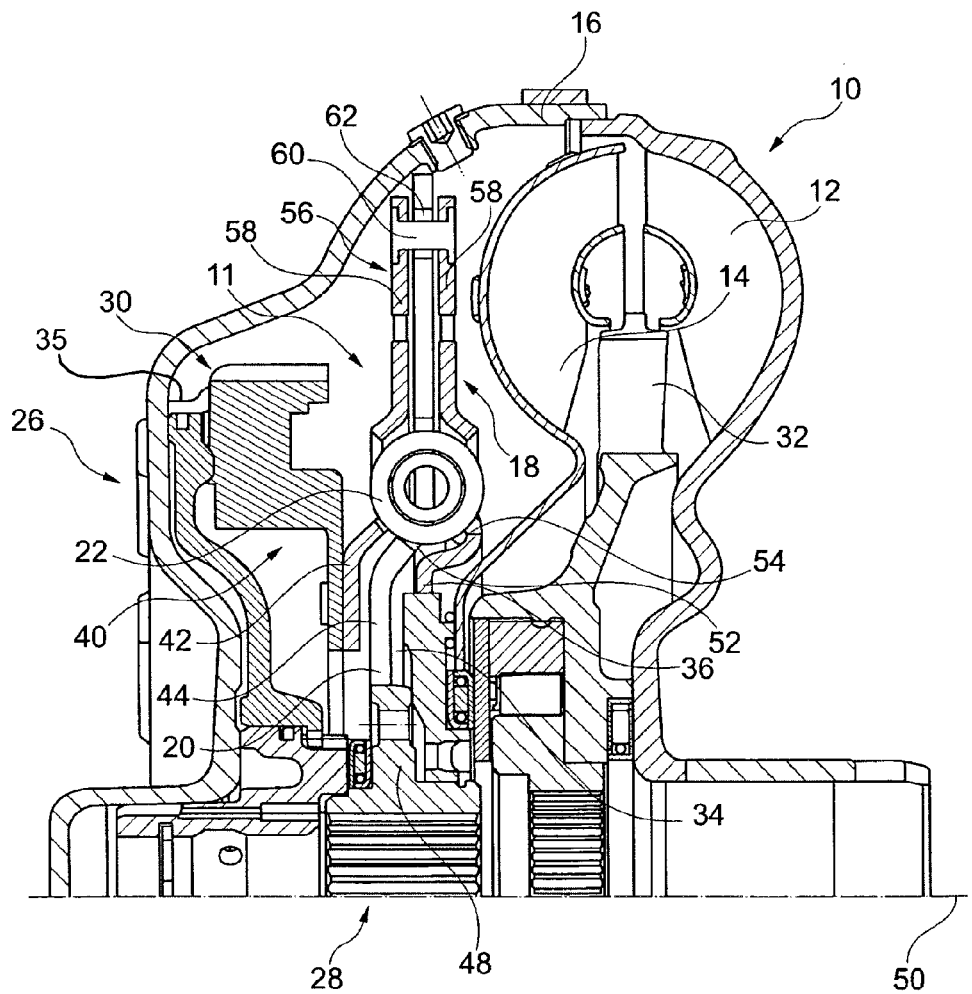
FIG. 2 illustrates a semi-sectional view of a torque transmission device in a particular embodiment of the invention; and, FIG. 3 illustrates a diagram of the improvement in torsion vibration damping that is achievable over a prior art torque transmission device through the torque transmission device according to a special embodiment of the invention.

FIG. 2 illustrates an embodiment of the torque transmission device 10 in a semi-sectional view. A torque introduced from the output side 26 through the converter housing 16 into the pump shell 12 is transmitted through the fluid included in the converter housing 16 to the turbine shell 14 forming a first torque transmission path, possibly in cooperation with a stator shell 32. The turbine shell 14 is centrally received on a turbine hub 34 with respect to the rotation axis 50 and connected non-rotatably through the turbine hub 34 with a first disc component 36 of the torsion vibration damper 11. The damper input component 18 of the torsion vibration damper 11 is formed by the first disc component 36 and a second disc component 42 arranged axially offset from the first disc component, wherein both disc components are connected with one another axially non-rotatably. A clutch output component 40 of a converter lockup clutch 30 arranged within the converter housing 16 is attached at the second component 42. Clutch input component 35 is connectable with converter housing (16). The converter lockup clutch 30 in closed condition facilitates a transmission of the torque coming from the output side 26 through the converter housing 16 to the damper input component 18 of the torsion vibration damper 11 for forming the second torque transmission path between the converter housing 16 and the input side 28.

The torsion vibration damper 11 includes a damper output component 20 axially arranged between the first disc component 36 and the second disc component 42 and configured as a damper flange 44 which is operatively coupled with the damper input component 18 through spring elements 22 arranged on the circumference in flange cut-outs 52 of the damper flange 44 and in partial disc cut-outs 54 of the damper input component 18. The damper flange 44 is received on a damper hub 48 and centered with respect to the rotation axis 50 and connected non-rotatably therewith. The damper hub 48 is connectable with a transmission input shaft not illustrated herein of a transmission arranged on the input side 28.

Radially outside of the outer circumference of the damper component 18, a speed adaptive vibration absorber 24 configured as a centrifugal force pendulum 56 is arranged at the damper flange 44. Thus, pendulum masses 58 are arranged on both sides at the damper flange 44 distributed over the circumference, wherein axially opposite pendulum masses 58 are connected with one another through a connection bolt 60 which is supported through a connection cut-out 62 in the damper flange 44. The pendulum masses 58 are supported movable within limits relative to the damper flange 44 through roller elements not illustrated herein. The roller elements roll during a movement of the pendulum masses 58 relative to the damper flange 44 in race cut-outs introduced therein and not visible in this sectional view, wherein the axial thickness of the damper flange 44 is in particular greater by 0.5 mm to 1 mm than for conventional embodiments without centrifugal force pendulum. The shape and size of the connection cut-out 62 is sized so that the connection bolt 60 is movable without restrictions over the pivot range defined on the base of the race cut-out, wherein the connection bolt 60 can be configured in particular as a stop for limiting the pivot portion of the pendulum masses 58.

Figure 3:
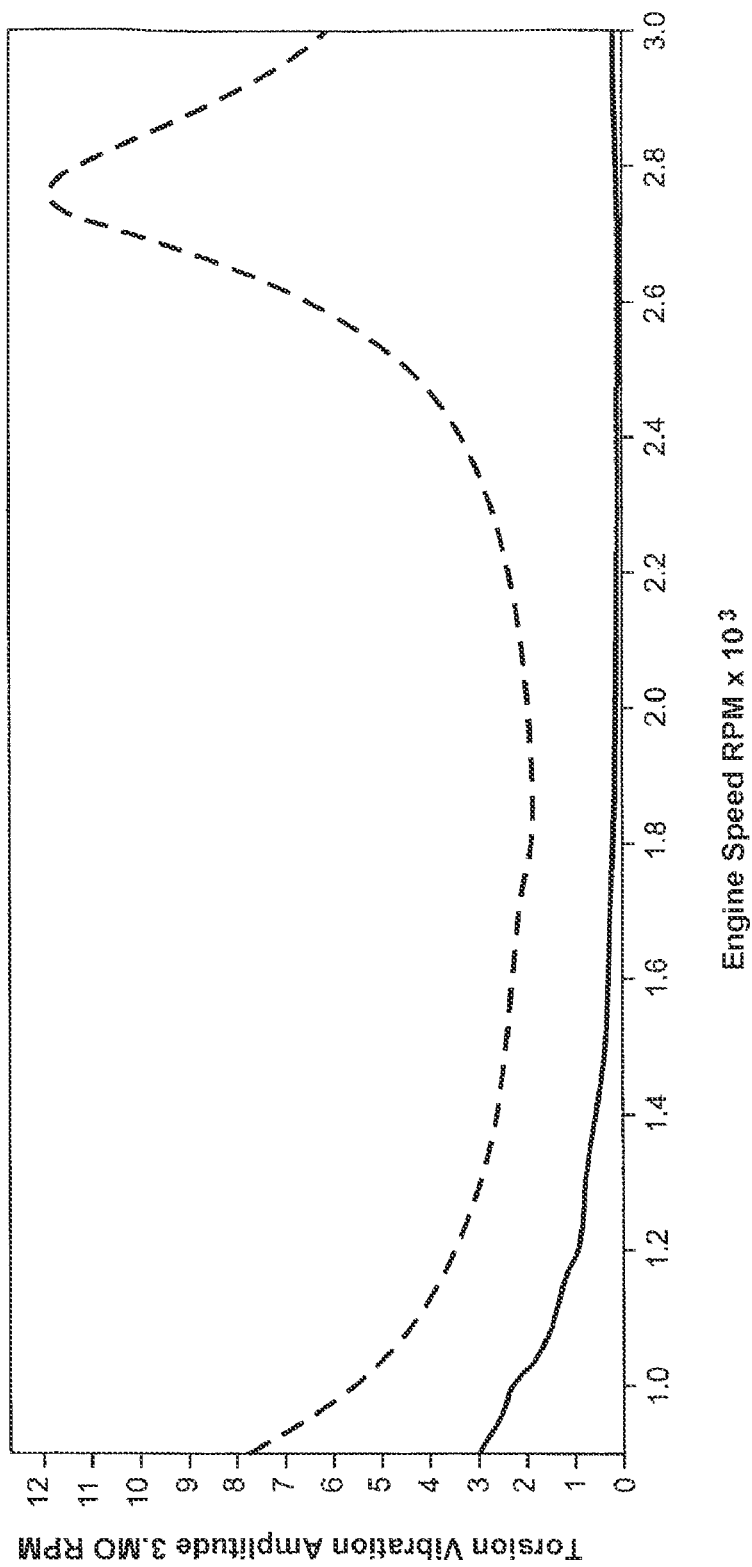

FIG. 3 illustrates a diagram which compares the torsion vibration damping of a torque transmission device with a prior art torsion vibration damper with the torsion vibration damping of a torque transmission device in a particular embodiment of the invention. The curves represent the development of the torsion vibration amplitude of the third motor order as a function of the rotational frequency of the internal combustion engine depicted in the form of a speed variation. The smaller the torsion vibration amplitude, the better the damping of the torsion vibration. It is apparent that the torsion vibration amplitude is dampened better over the illustrated speed range for the torque transmission device according to the particular embodiment of the invention which includes a centrifugal force pendulum arranged at the torsion vibration damper and which is characterized by the solid curve compared to a prior art torque transmission device characterized by the dashed curve.

REFERENCE NUMERALS AND DESIGNATIONS 10 torque transmission device
11 torsion vibration damper
12 pump shell
14 turbine shell
16 converter housing
18 damper input component
20 damper output component
22 spring element
24 vibration absorber
26 output side
28 input side
30 convert lockup clutch
32 stator shell
34 turbine hub
36 first disc component
40 clutch output component
42 second disc component
44 damper flange
48 damper hub
50 rotation axis
52 flange cutout
54 disc component cutout
56 centrifugal force pendulum
58 pendulum mass
60 connection bolt
62 connection cutout

What is claimed is:
1. A torque transmission device (10) comprising:
a pump shell (12) arranged in a converter housing (16) and connected to an output side and a turbine shell (14) drivable by the pump shell through a fluid for forming a first torque transmission path between the converter housing (16) and an input side (28);
a converter lockup clutch (30) with a clutch input component that is connectable with the converter housing (16) and a clutch output component (40) configured to be brought into frictional engagement with the clutch input component for partially or completely bridging the first torque transmission path for configuring a second torque transmission path between the converter housing (16) and the input side (28);
a torsion vibration damper (11) arranged in the force flow between the clutch output and the input side (28); and a vibration absorber (24), wherein the torsion vibration damper (11) includes a damper input component (18) and a damper output component (20) that is rotatable within limits against the effect of at least one spring element (22) directly or indirectly relative to the damper input component (18) and connected non-rotatably with the input side (28), wherein the turbine is rotatable through the effect of the at least one spring element relative to the input side, wherein the vibration absorber (24) is mounted on the damper output component (20) radially outward of a radially outermost spring element from the at least one spring element.

2. The torque transmission device (10) recited in claim 1, wherein reduction of torsional vibrations by the vibration absorber (24) is facilitated through a range of speed for an engine connected to the output side.

3. The torque transmission device (10) recited in claim 2, wherein the vibration absorber (24) is configured as a centrifugal force pendulum (56) with pendulum masses (58) that are movable within limits over the circumference of the damper output component (20) relative to the damper output component (20).

4. The torque transmission device (10) recited in claim 3, wherein the pendulum masses (58) are arranged on both sides at the damper output component (20) in particular radially outside of the outer circumference of the damper input component (18).

5. The torque transmission device (10) recited in claim 1, wherein the damper input component (18) is configured from at least two disc components (36, 42), which are in particular axially offset from one another.

6. The torque transmission device (10) recited in claim 5, wherein the damper output component (20) is axially received between the at least two disc components (36, 42).

7. The torque transmission device (10) recited in claim 1, wherein the damper output component (20) is connectable non-rotatably on the input side with a damper hub (48) that is connectable with a transmission input shaft of a transmission.

8. The torque transmission device (10) recited in claim 1, wherein the damper input component (18) is connectable non-rotatably with a turbine hub (34) receiving the turbine shell (14).

9. The torque transmission device (10) recited in claim 1, wherein the torsion vibration damper (11) is arranged within the converter housing (16).

10. The torque transmission device (10) recited in claim 1, wherein the converter lockup clutch (30) is arranged within the converter housing (16), wherein the clutch output component (40) of the converter lockup clutch is connectable with the damper input component (18).

11. A torque transmission device (10) comprising:
a pump shell (12) arranged in a converter housing (16) and connected to an output side and a turbine shell (14) drivable by the pump shell through a fluid for forming a first torque transmission path between the converter housing (16) and an input side (28);
a converter lockup clutch (30) with a clutch input component that is connectable with the converter housing (16) and a clutch output component (40) configured to be brought into frictional engagement with the clutch input component for partially or completely bridging the first torque transmission path for configuring a second torque transmission path between the converter housing (16) and the input side (28);
a torsion vibration damper (11) arranged in the force flow between the clutch output and the input side (28); and a vibration absorber (24), wherein the torsion vibration damper (11) includes a damper input component (18) and a damper output component (20) that is rotatable within limits against the effect of at least one spring element (22) directly or indirectly relative to the damper input component (18) and connected non-rotatably with the input side (28), wherein the turbine is rotatable through the effect of the at least one spring element relative to the input side, wherein the vibration absorber (24) is mounted on the damper output component (20) and wherein pendulum masses (58) are arranged on both sides of the damper output component (20) radially outside of the outer circumference of the damper input component (18).

12. A torque transmission device (10) comprising:

a pump shell (12) arranged in a converter housing (16) and connected to an output side and a turbine shell (14) drivable by the pump shell through a fluid for forming a first torque transmission path between the converter housing (16) and an input side (28) forming an output for the torque converter;

a converter lockup clutch (30) with a clutch input component that is connectable with the converter housing (16) and a clutch output component (40) configured to be brought into frictional engagement with the clutch input component for partially or completely bridging the first torque transmission path for configuring a second torque transmission path between the converter housing (16) and the input side (28);

a torsion vibration damper (11) arranged in the force flow between the clutch output and the input side (28), wherein the torsion vibration damper (11) includes a damper input component (18) and a damper output component (20) that is rotatable within limits against the effect of at least one spring element (22) directly or indirectly relative to the damper input component (18), directly engaged with the at least one spring element, and connected non-rotatably with the input side (28); and a vibration damper including first and second pendulum masses connected to each other by at least one connection element passing through the damper output component and wherein the turbine is rotatable through the effect of the at least one spring element relative to the input side.

* * * * *